United States Patent
Luo et al.

(10) Patent No.: US 7,627,154 B2
(45) Date of Patent: Dec. 1, 2009

(54) AUTOMATED RADIOGRAPH CLASSIFICATION USING ANATOMY INFORMATION

(75) Inventors: Hui Luo, Rochester, NY (US); Xiaohui Wang, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 634 days.

(21) Appl. No.: 11/285,568

(22) Filed: Nov. 21, 2005

(65) Prior Publication Data

US 2006/0110036 A1 May 25, 2006

Related U.S. Application Data

(60) Provisional application No. 60/630,286, filed on Nov. 23, 2004.

(51) Int. Cl.
*G06K 9/00* (2006.01)
*A61B 5/05* (2006.01)

(52) U.S. Cl. .................. 382/128; 128/922; 600/425

(58) Field of Classification Search ........... 382/132, 382/170, 173, 128–131; 128/922; 600/425
See application file for complete search history.

(56) References Cited

U.S. PATENT DOCUMENTS

| 5,668,888 | A | | 9/1997 | Doi et al. | |
|---|---|---|---|---|---|
| 5,791,346 | A | * | 8/1998 | Craine et al. | 600/407 |
| 5,943,435 | A | * | 8/1999 | Gaborski | 382/132 |
| 6,101,408 | A | * | 8/2000 | Craine et al. | 600/425 |
| 6,585,647 | B1 | * | 7/2003 | Winder | 600/437 |
| 2003/0103665 | A1 | * | 6/2003 | Uppaluri et al. | 382/131 |
| 2003/0215120 | A1 | * | 11/2003 | Uppaluri et al. | 382/128 |
| 2004/0024315 | A1 | * | 2/2004 | Chalana et al. | 600/443 |

FOREIGN PATENT DOCUMENTS

EP 1 450 303 8/2004

OTHER PUBLICATIONS

Hui Luo et al., "Knowledge-based Image Understanding and Classification System for Medical Image Database", 2002, Proceedings of SPIE, Vo. 4684, pp. 1224-1234.*
Xiaohui Wang, Hui Luo—Eastman Kodak Company, Medical Imaging 2004: Image Procesing, Proceedings of SPIE, vol. 5370, Automatic and Exam-Type Independent Algorithm for the Segmentation and Extraction of Foreground, Background, and Anatomy Regions in Digital Radiographic Images, pp. 1427-1434.
U.S. Appl. No. 10/993,055, filed Nov. 19, 2004, Luo et al.
U.S. Appl. No. 60/630,270, filed Nov. 23, 2004, Luo et al.
U.S. Appl. No. 60/630,287, filed Nov. 23, 2004, Luo et al.
U.S. Appl. No. 60/630,326, filed Nov. 23, 2004, Luo et al.

(Continued)

*Primary Examiner*—Aaron W Carter

(57) ABSTRACT

A method for automatically classifying a radiograph. A digital radiographic image is acquired, wherein the image is comprised of a matrix of rows and columns of pixels. The digital image is segmented into foreground, background, and anatomy regions. A physical size of the anatomy region is classified. An edge direction histogram of the anatomy region is generated and a shape pattern of the edge direction histogram is classified. Based on the physical size classification and the shape pattern classification, the image is categorized.

5 Claims, 9 Drawing Sheets

OTHER PUBLICATIONS

U.S. Appl. No. 10/625,919, filed Jul. 24, 2003, Wang et al.

W. Niblack et al., The QBIC Project: Querying Images By Content Using Color, Texture, and Shape, SPIE vol. 1908 (1993) pp. 173-187.

A. Pentland et al., Photobook: Content-Based Manipulation of Image Databases, International Journal of Computer Vision, Fall 1995 (Jun. 12, 1995).

Jeffrey R. Bach et al., The Virage Image Search Engine: An open framework for image management, SPIE vol. 2670, pp. 76-87.

John R. Smith et al., VisualSEEk: a fully automated content-based image query, ACM Multimedia 96, Boston, MA Nov. 20, 1996.

Wei-Ying Ma et al., NeTra: A toolbox for navigating large image databases, Multimedia Systems 7: (1999) pp. 184-198.

Tom Huang et al., Multimedia Analysis and Retrieval System (MARS) Project, Proc of 33rd Annual Clinic on Library Application of Data Processing Digital Image Access and Retrieval, 1996.

I. Kawashita et al., Development of Computerized Method for Automated Classification of the Body Parts in Digital Radiographs, RSNA 2002.

J. Dahmen et al., Classification of Radiographs in the Image Retrieval in Medical Applications—System (IRMA), Proc 6th International RIAO Conference on Content-based Multimedia Information Access- Paris, France, 2000, pp. 551-566.

Hui Luo et al., Knowledge-based Image Understanding and Classification System for Medical Image Database, Proceedings of SPIE—The International Society for Optical Engineering, Vo. 4694, No. 22, Feb. 2002, pp. 1224-1234.

* cited by examiner

 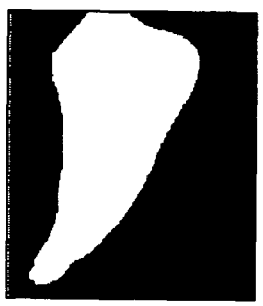  
FIG. 3A-1  FIG. 3A-2  FIG. 3B-1  FIG. 3B-2
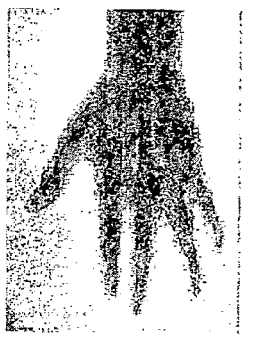 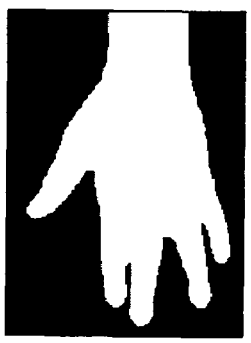  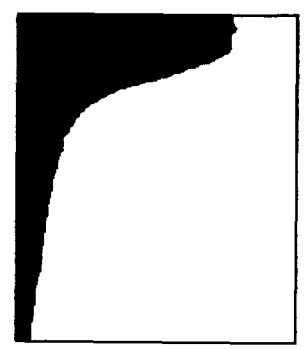
FIG. 3C-1  FIG. 3C-2  FIG. 3D-1  FIG. 3D-2
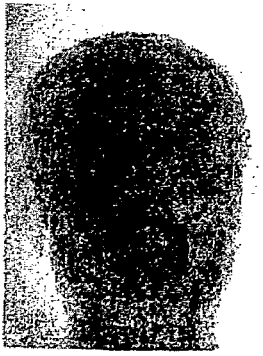 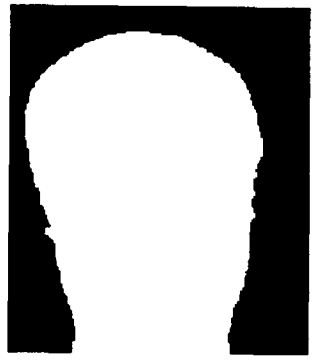
FIG. 3E-1  FIG. 3E-2

 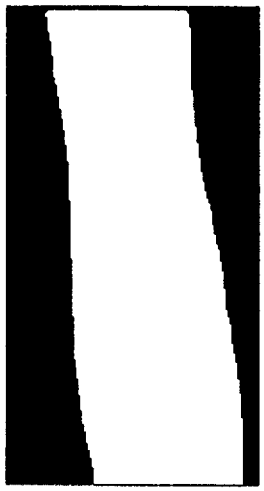 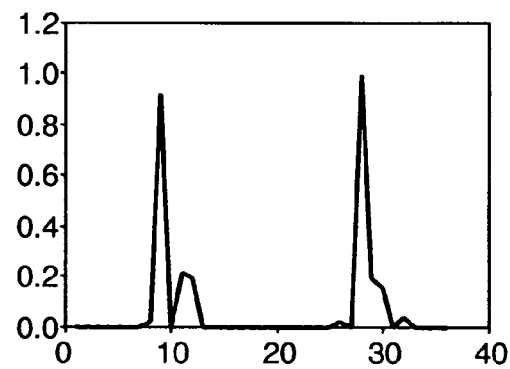
FIG. 8A-1     FIG. 8B-1     FIG. 8C-1
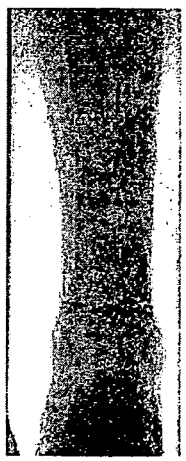  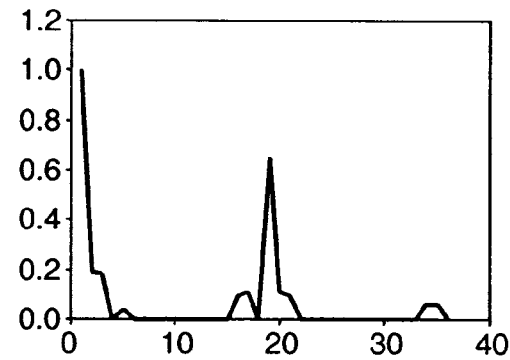
FIG. 8A-2     FIG. 8B-2     FIG. 8C-2

AUTOMATED RADIOGRAPH CLASSIFICATION USING ANATOMY INFORMATION

CROSS REFERENCE TO RELATED APPLICATIONS

Reference is made to, and priority is claimed from, U.S. Provisional Application No. 60/630,286 entitled "AUTOMATED RADIOGRAPH CLASSIFICATION USING ANATOMY INFORMATION", filed on Nov. 23, 2004 in the names of Luo et al, and which is assigned to the assignee of this application, and incorporated herein by reference.

Reference is made to commonly assigned application U.S. Ser. No. 10/993,055 entitled "DETECTION AND CORRECTION METHOD FOR RADIOGRAPH ORIENTATION", filed on Nov. 19, 2004 in the names of Luo et al, and which is assigned to the assignee of this application, and incorporated herein by reference.

Reference is further made to U.S. Provisional Application No. 60/630,270, entitled "METHOD FOR AUTOMATIC SHAPE CLASSIFICATION", filed on Nov. 23, 2004 in the names of Luo et al, and which is assigned to the assignee of this application, and incorporated herein by reference.

Reference is further made to U.S. Provisional Application No. 60/630,287 entitled "METHOD FOR RECOGNIZING PROJECTION VIEWS OF RADIOGRAPHS", filed on Nov. 23, 2004 in the names of Luo et al, and which is assigned to the assignee of this application, and incorporated herein by reference.

Reference is also made to U.S. Provisional Application No. 60/630,326 entitled "METHOD FOR CLASSIFYING RADIOGRAPHS", filed on Nov. 23, 2004 in the names of Luo et al, and which is assigned to the assignee of this application, and incorporated herein by reference.

FIELD OF THE INVENTION

This invention relates to techniques for the processing of digital radiography, and in particular to the automated classification of digital radiographic images.

BACKGROUND OF THE INVENTION

Accurate medical diagnosis often depends on the correct display of diagnostically relevant regions in images. ith the recent advance of computed radiographic systems and digital radiographic systems, the acquisition of an image and its final 'look' are separated. His provides flexibility to users, but also introduces the difficulty in setting an appropriate tone scale for image display. n optimal tone scale, in general, is dependent upon the examination type, the exposure conditions, the image acquisition device and the choice of output devices as well as the preferences of the radiologist. among them, the examination type is one determinant factor, since it is directly related to the characteristics of signal and clinical important parts in images. Therefore, the success of classifying examination types can greatly benefit the optimal rendition of images. Another emerging field of using the examination type classification is digital Picture Archiving and Communication Systems (PACS). To date, most radiograph related information is primarily based on manual input. This step is often skipped or the incorrect information is recorded in the image header, which hinders the efficient use of images in routine medical practice and patient care. The automated image classification has potential to solve the above problem by organizing and retrieving images based on image contents. This can make the medical image management system more rational and efficient, and undoubtedly improve the performance of PACS.

However, it is difficult to let a computer automatically and efficiently analyze contents in images and classify images, since image data is more structurally complex than other kinds of data and the way by which human beings capture the image contents, group image features into meaningful objects and attach semantic descriptions to images through model matching has not been fully understood to automate the analysis procedure. Furthermore, segmenting an image into regions corresponding to individual objects, extracting features from the image that capture the perceptual and semantic meanings, and matching the image with the proposed model based on extracted features also make the analysis problem more challenging.

Various systems have been proposed in the recent literatures for content-based image classification and retrieval, such as QBIC (W. Niblack, et al, "The QBIC project: Querying images by content using color, texture, and shape" Proc. SPIE Storage and Retrieval for Image and Video Databases, Feburary 1994), Photobook (A. Pentland, et. al. "Photobook: Content-based manipulation of image database". International Journal of Computer Vision, 1996), Virage (J. R. Bach, et al. "The Virage image search engine: An open framework for image management" Proc. SPIE Storage and Retrieval for image and Video Database, vol 2670, pp. 76-97, 1996), Visualseek (R. Smith, et al. "Visualseek: A fully automated content-based image query system" Proc ACM Multimedia 96, 1996), Netra (Ma, et al. "Netra: A toolbox for navigating large image databases" Proc IEEE Int. Conf. On Image Proc. 1997), and MAR (T. S. Huang, et. al, "Multimedia analysis and retrieval system (MARS) project" Proc of $33^{rd}$ Annual Clinic on Library Application of Data Processing Digital Image Access and Retrieval, 1996). These systems follow the same paradigm which treats an image as a whole entity and represents it via a set of low-level feature attributes, such as color, texture, shape and layout. As a result, these feature attributes together form a feature vector for an image. The image classification is based on clustering these low-level visual feature vectors. Such clustering-based classification schemes are usually time-consuming and of limited practical use since little of the image object semantics is explicitly modeled. Another problem is that these systems use images collected from the world wide web. Usually, the most effective feature is color. Unfortunately, the color-based features are not available in most medical images.

I. Kawshita et. al. ("Development of Computerized Method for Automated Classification of Body Parts in Digital Radiographs", RSNA 2002) present a method to classify six body parts. The method examines the similarity of a given image with a set of template images by using the cross-correlation values as the similarity measures. However, the manual generation of the template images is quite time consuming, and more crucial, it is highly observer dependent, which may introduce error in the classification. J. Dahmen, et al ("Classification of Radiographs in the 'Image Retrieval in Medical Application'-System", Procs 6th International RIAO Conference on Content-Based Multimedia Information Access, Paris, France, 2000; 551-566) teach a method to classify radiographs by using a new distortion model and an extended version of simard's tangent distance with a kernel density based classifier. Both of the above methods suffer problems in handling rotation and translation variance of anatomy in radiographs. So the result measures cannot accurately represent the features in radiographs. In addition, no preprocessing is implemented in the above methods. For example, the unexposed regions caused by the blocking of the x-ray collimator during the exposure may result in a significant white borders surrounding the image. If such regions are not removed in a pre-processing step and therefore used in the computation of similarity measures, the classification results can be seriously biased. Luo et. al ("Knowledge—based Image Understanding and Classification System for Medical Image Databases", Proceedings of SPIE—the International Society for Optical Engineering. Vol. 4694, No. 22, February 2002. pp. 1224-1234) disclose a method for classification using shape information and model match. The method employs the edge direction histogram to describe the global shape of anatomy, and classifies images based on six scale, rotation and translation features extracted from their edge direction histograms. However, the extracted features are not sufficient to fully represent the characteristics of the edge direction histogram. As a result, the classifier's performance is hard to be improved.

Given the drawbacks and limitation of the prior art, there exists a need for a method to automatically classify radiographic images.

SUMMARY OF THE INVENTION

One object of the present invention is to provide an automated method for classifying radiographs based on the anatomy information.

Another object of the present invention is to provide a method for classifying radiographs using the physical size of anatomical structures.

Another object of the present invention is to provide a method for classifying radiographs using the shape information of anatomical structures.

According the present invention, these objectives are achieved by the following steps: acquiring a digital radiographic image including a matrix of rows and columns of pixels; segmenting the image into foreground, background and anatomy regions; classifying the image using the physical size of anatomy and the shape of its edge direction histogram, respectively; and categorizing the image.

An advantage of the present invention is that the method provides an efficient way to extract the features of anatomy in images and a deliberate design of scale, rotation and translation invariant shape classifier, which makes the classification more robust.

BRIEF DESCRIPTION OF THE DRAWINGS

FIGS. 3A-1 through 3E-2 show diagrammatic views demonstrating the shape variations in radiographs from different examinations.

FIGS. 5A-1 through 5D-3 illustrate characteristics of an edge direction histogram. FIGS. 5A-1, 5A-2 and 5A-3 are diagrammatic views showing the synthetic images which have the same shape but with different orientations. FIGS. 5B-1, 5B-2 and 5B-3 are diagrammatic views displaying their edge images. FIGS. 5C-1, 5C-2, and 5C-3 are graphical views showing their corresponded edge direction histogram. FIGS. 5D-1, 5D-2 and 5D-3 are graphical views depicting the simplified description of the edge direction histogram.

FIGS. 7A-1 through 7B-2 show images with one-peak shape pattern edge direction histogram. FIGS. 7A-1 and 7A-2 display the original images. FIGS. 7B-1 and 7B-2 are the anatomy images. FIGS. 7C-1 and 7C-2 shows their edge direction histograms.

FIGS. 8A-1 through 8C-2 show images with two-peak shape pattern edge direction histogram. FIGS. 8A-1 and 8A-2 display the original images. FIGS. 8B-1 and 8B-2 are the anatomy images. FIGS. 8C-1 and 8C-2 shows their edge direction histograms.

FIGS. 9A-1 through 9C-2 show images with the other shape pattern edge direction histogram. FIGS. 9A-1 and 9A-2 display the original images. FIGS. 9B-1 and 9B-2 are the anatomy images. FIGS. 9C-1 and 9C-2 shows their edge direction histograms.

DETAILED DESCRIPTION OF THE INVENTION

Figure 1:
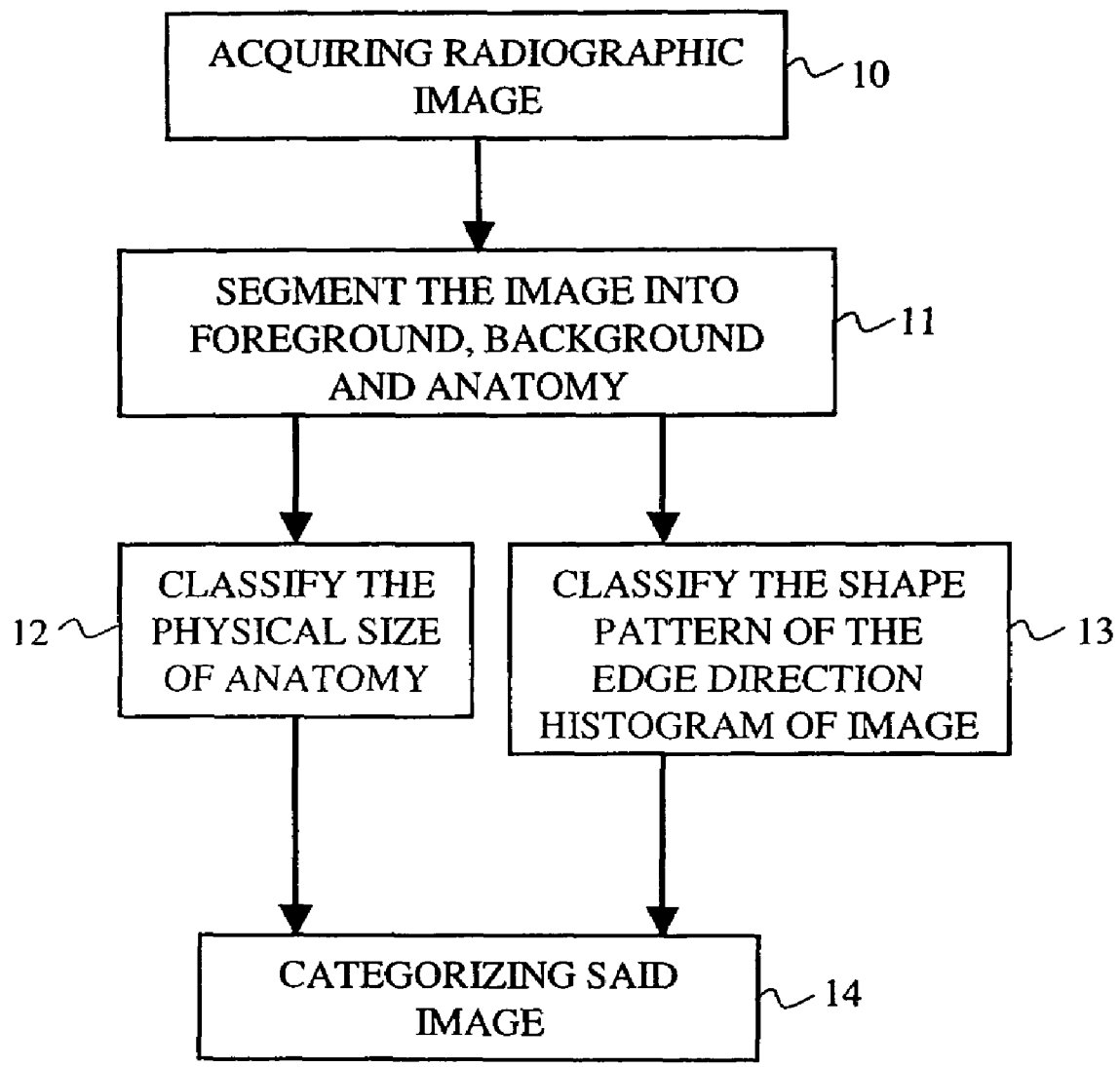
FIG. 1 is a schematic diagram illustrating the automated method for classifying radiographs.

The following is a detailed description of the preferred embodiments of the invention, reference being made to the drawings in which the same reference numerals identify the same elements of structure in each of the several figures.

The present invention discloses a method for automatically classifying radiographs. A flow chart of a method in accordance with the present invention is generally shown in FIG. 1. As shown in FIG. 1, the method includes three stages. In the first stage, the input radiograph (box 10) is segmented (step 11) into three regions, which are: a collimation region (foreground), a direct exposure region (background) and a diagnostically relevant region (anatomy). Then, two classifications are performed on the image: one is based on a size of the anatomy (box 12), the other is based on a shape of the anatomy (box 13). Afterwhich, the results from these two classifications are combined and the input image is categorized into one of classed, for example, one of eight classes (box 14).

Figure 2A:
FIGS. 2A-2D are diagrammatic views which show an example of a radiograph acquired by computed radiography, and its foreground, background and anatomy images from the segmentation, respectively.
Figure 2B:
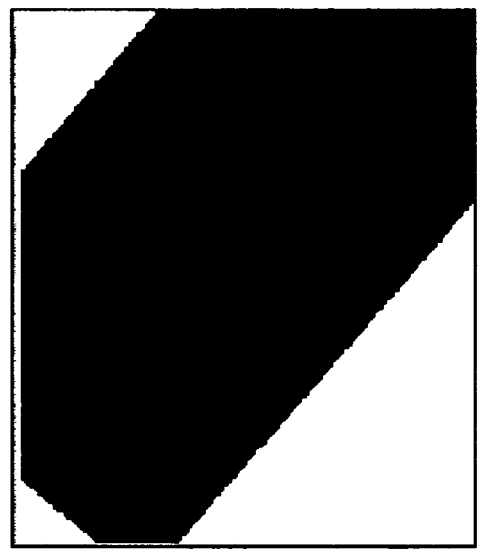
Figure 2C:
Figure 2D:
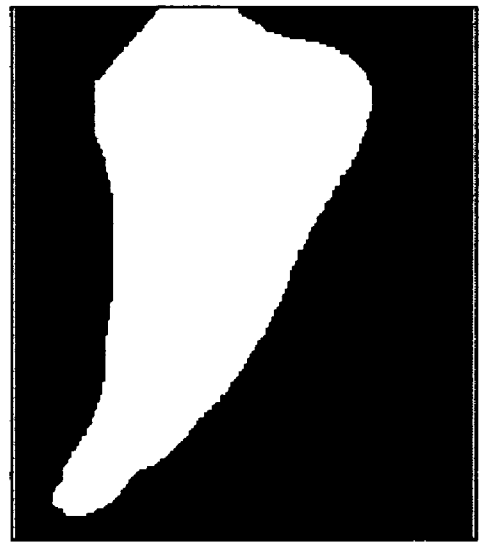

Image segmentation (step 11) can be accomplished using methods known to those skilled in the art. One such segmentation method is disclosed in U.S. Ser. No. 10/625,919 filed on Jul. 24, 2003 by Wang et al. entitled METHOD OF SEGMENTING A RADIOGRAPHIC IMAGE INTO DIAGNOSTICALLY RELEVANT AND DIAGNOSTICALLY IRRELEVANT REGIONS, commonly assigned and incorporated herein by reference. FIG. 2A shows an exemplary radiograph and FIGS. 2B-2D show the foreground, background, and anatomy images obtained from segmentation.

According to the present invention, the classification of radiograph focuses on two aspects: 1) the physical size of anatomical structure in a radiograph, and 2) the shape of anatomy in the radiograph. For example, there is a significant different between the size of foot and abdomen. Therefore, using the physical size information can help to separate these two anatomy types. Similarly, the shape feature of anatomy is another important characteristics that can be used for classification.

FIGS. 3A-1 through 3E-2 show radiographs from different examinations together with their anatomy images. It is apparent from these figures that there is a large shape variation among them. If such variation can be accurately captured, these images can be readily classified.

To classify a physical size of anatomy, six features are preferably employed. A first feature is pixel-spacing, which is a real physical size represented by each pixel in a radiograph.

Second and third features are the width and height of the anatomy image, which may be smaller than the width and height of the input radiograph because of the portion of foreground region. A fourth feature is a ratio of the anatomy's area to the image area. A fifth feature is a ratio of the background area to the image area. A sixth feature is a ratio of the foreground area to the image area.

These features are then input into a classifier, which is trained to classify the physical size of anatomy in images. The classifier can use methods known to those skilled in the art, such as neural network, support vector machine or others. The result from classifier will divide images into two groups: the image with large size anatomy, such as abdomen, pelvis, and chest, or the image with small size anatomy, for example hand, elbow, wrist and so on.

According to an embodiment of the present invention, a neural network has been employed to perform the classification. The neural network has three layers: an input layer which has six nodes corresponding to the six features described above, a hidden layer and a output layer with two nodes, one for each groups.

Figure 4:
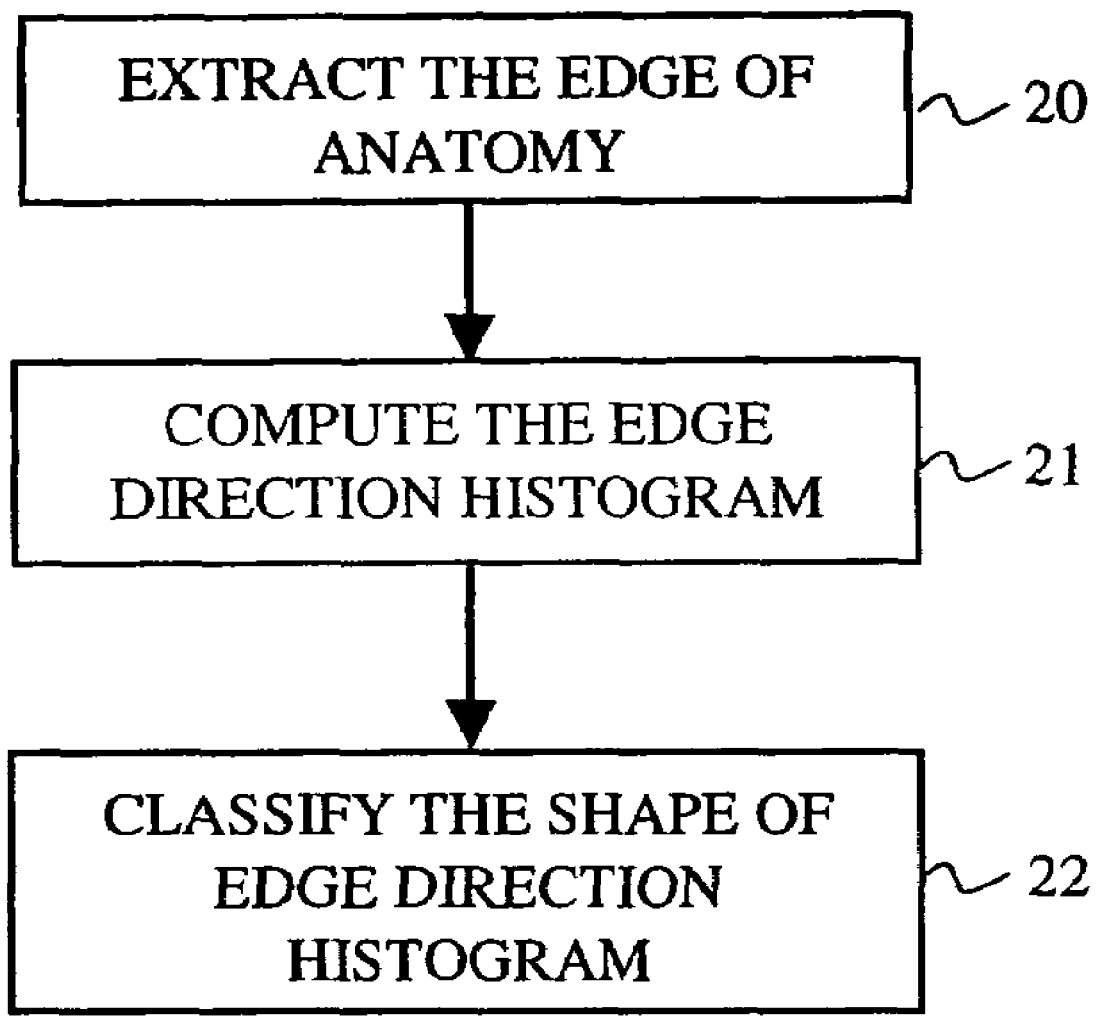
FIG. 4 is a flow chart illustrating a method for classifying the shape of anatomy.
Figure 5:
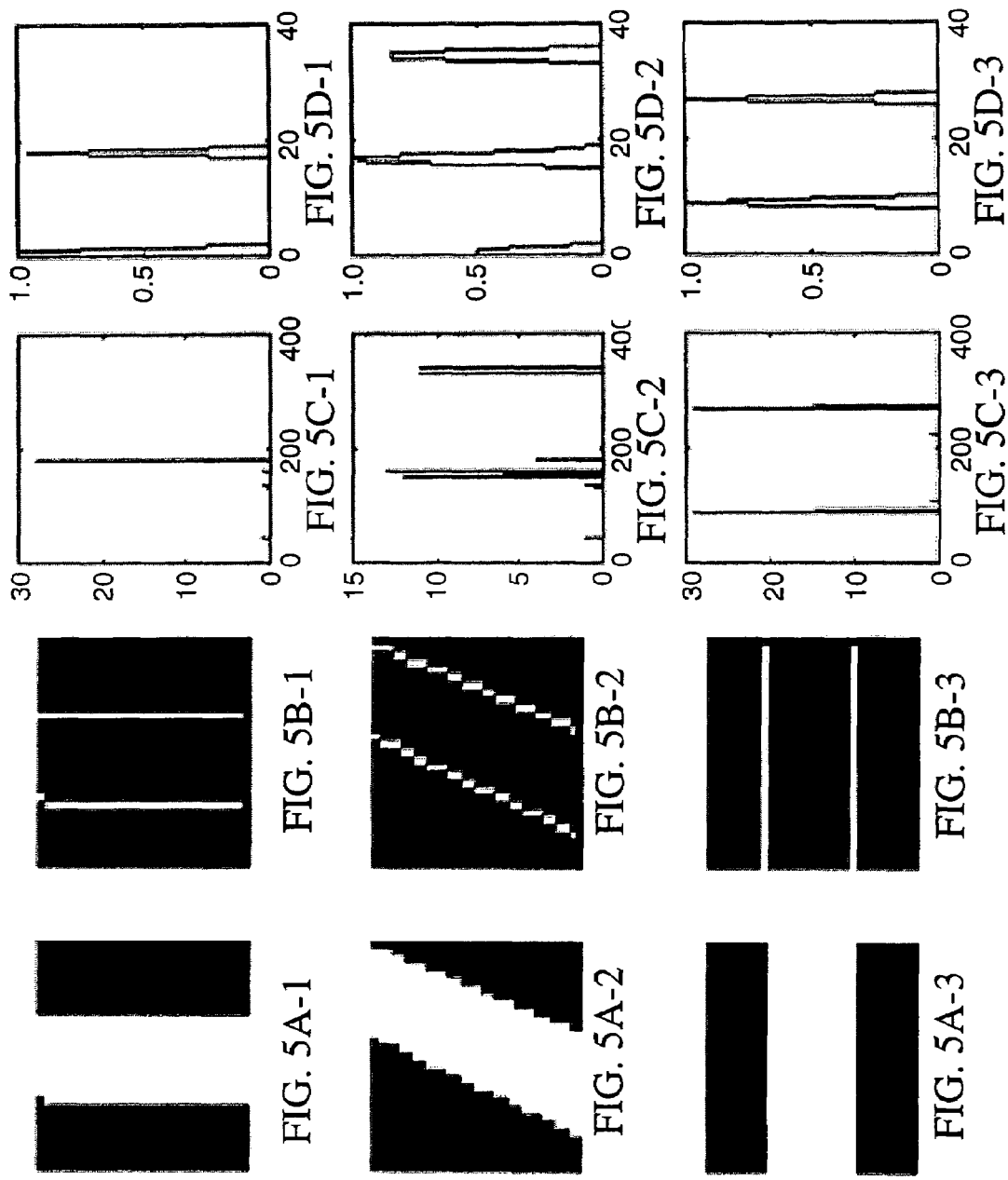

There are known methods to conduct shape analysis. However, a concise and quantitative description of the object shape is a challenging problem, especially describing a shape by a set of scale, rotation and translation invariant features. The present invention addresses the above problem by a deliberate design of shape classifier. FIG. 4 illustrates a flow chart for a procedure used for shape classification, which includes the following steps.

A first step is to extract an edge of anatomy (box 20). As an embodiment of the present invention, a standard morphological operation is used, and the edge of anatomy is obtained by first performing dilation on the anatomy image, then subtracting the result image from the anatomy image. To avoid the noise edge introduced by a collimator, the foreground mask is preferably employed to evaluate the detected edges and remove all suspicious edges. An advantage of using dilation is that it fills smalls holes on the anatomy, therefore smoothes the edge of anatomy. In addition, it can ensure one pixel wide edge, which is related to the characteristics of edge direction histogram. It is noted that the present invention is not limited to using morphological operations to extract the edge of anatomy. Other edge detection algorithm(s) can be used wherein the edge of anatomy is accurately detected and has one pixel width.

A second step is to compute the edge direction for each edge point, and then generate an edge direction histogram (box 21). Computing the edge direction can be performed by methods known in the art. In an embodiment of the present invention, the following Sobel edge operators are used as a detectors of horizontality and verticality of edges.

$$h1 = \begin{bmatrix} 1 & 2 & 1 \\ 0 & 0 & 0 \\ -1 & -2 & -1 \end{bmatrix} \quad h2 = \begin{bmatrix} -1 & 0 & 1 \\ -2 & 0 & 2 \\ -1 & 0 & 1 \end{bmatrix}$$

If the h1 response is y and the h2 response is x, the edge direction can be derived as $\tan^{-1}(y/x)$.

There are advantages and limitations in representing a shape with its edge direction histogram. To analyze them, three synthetic image examples are used, as shown in FIGS. 5A-1, 5A-2 and 5A-3. These images display the same stripe shape but with different orientation. FIGS. 5B-1, 5B-2 and 5B-3 show their edge images. Their corresponding edge direction histograms are illustrated in FIGS. 5C-1, 5C-2 and 5C-3. To simplify the description of the histogram, it is then quantified into 36 bins of 10° each. FIGS. 5D-1, 5D-2 and 5D-3 depict the final result. One concern of using edge direction histogram is whether the histogram is invariant to translation. Observation from the shown histograms show that the position of the object in the image has no effect on its edge directions. Therefore, any feature extracted from the histogram of edge directions is translation invariant. Another concern is about scale. Strictly speaking, the use of edge directions is inherently not scale invariant. Two images identical in every aspect except their size will yield different number of edge points and hence result in two different histograms. In order to achieve scale invariance, the histogram needs to be normalized as follows:

$$H(i)=H(i)/n_e \; i \in [0 \ldots, 35]$$

where H(i) is the count in bin i of the edge direction histogram, $n_e$ is the total number of edge points. Thus, the resulting histogram is ensured invariant to scale. Regarding the rotation, a histogram of the edge directions is not invariant to rotation either, as shown with reference to FIG. 5. Although these images contain similar shapes with different orientations, their histograms of edge directions are different. However, when the shape pattern of these histograms is considered, they appear rather similar in that they have two peaks with 180° distance. If such feature can be captured, the classifier can be made to invariant to rotation.

To address these concerns, a third step is employed to generate a scale, rotation, and translation invariant shape classifier and use it to classify the edge direction histogram (step 22).

Figure 6:
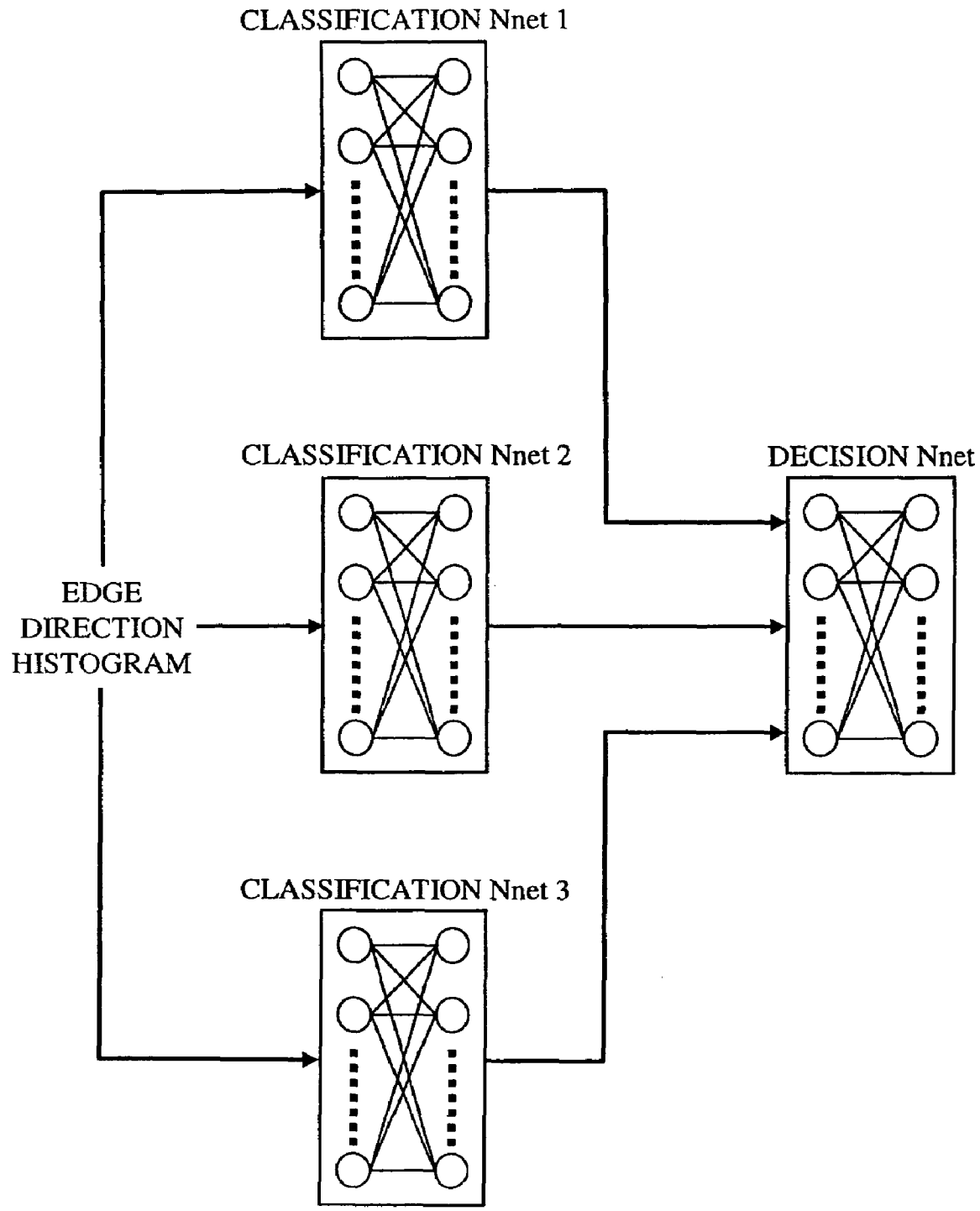
FIG. 6 is a graphical view showing a structure of a shape classifier.

According to an embodiment of the present invention, a shape classifier is constructed by using four multi-layer feed forward neural networks, three decision networks in the first level and one classification network in the second level, as illustrated in FIG. 6.

Figures 1, 7C:
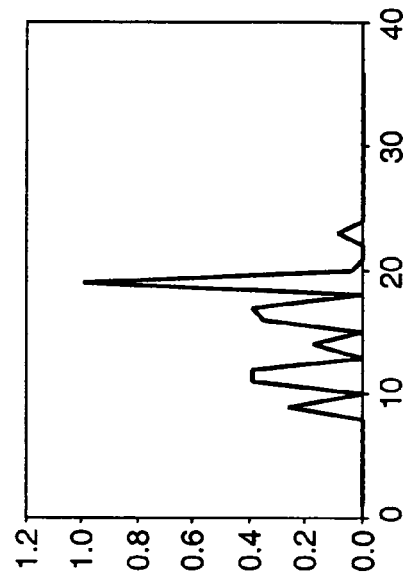
Figures 2, 7C:
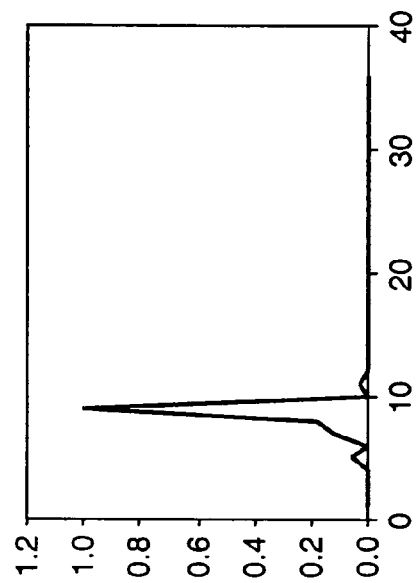
Figures 1, 7B:
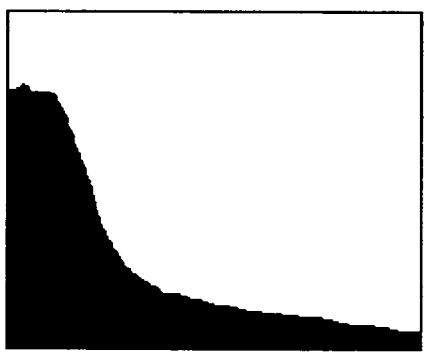
Figures 2, 7B:
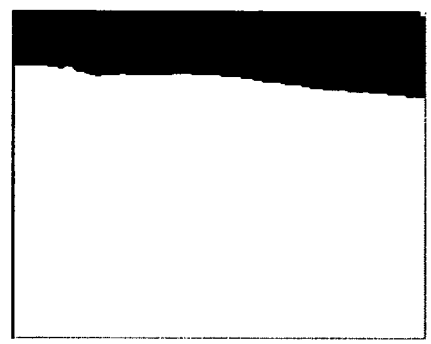
Figures 1, 7A:
Figures 2, 7A:
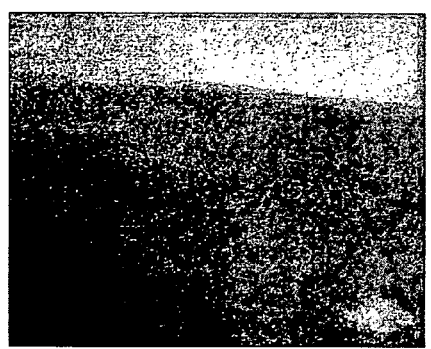
Figures 2, 9C:
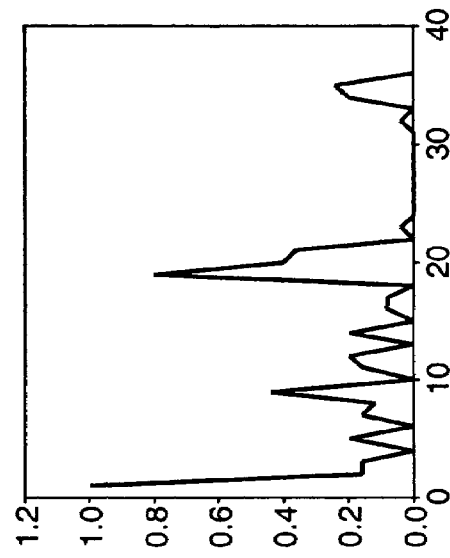
Figures 1, 9C:
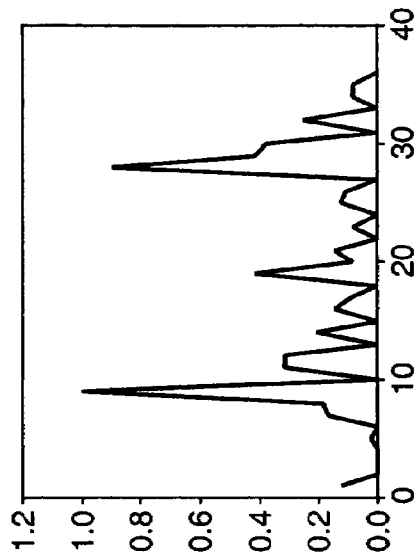
Figures 2, 9B:
Figures 1, 9B:
Figures 2, 9A:
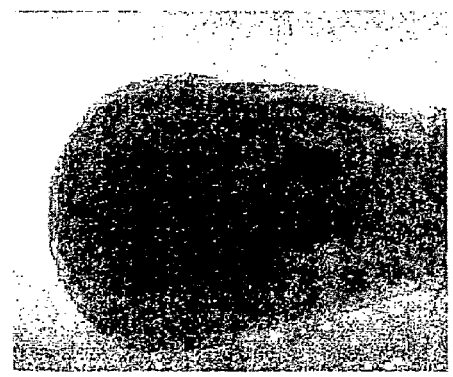
Figures 1, 9A:
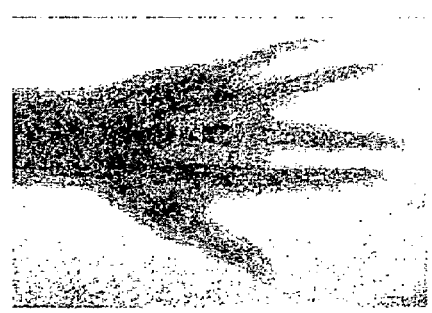

The decision neural networks in the first level focus on identifying a shape pattern of the edge direction histogram. For example, Neural Network 1 is used to recognize the edge direction histogram which has one significant peak, as shown in FIGS. 7B-1 and 7B-2. Neural Network 2 identifies the edge direction histogram with two peaks, as illustrated in FIGS. 8C-1 and 8C-2, and Neural Network 3 focuses on the rest of the shape pattern in the histograms, as shown in FIGS. 9C-1 and 9C-2. The structure of these three decision networks preferably includes 1) a 36 input node input layer, which corresponding to the 36 bins in the edge direction histogram, 2) a hidden layer and 3) a two-node output layer. Each node specifies how confident the input edge direction histogram is closed to the supposed shape pattern, or not. It is noted that a benefit of using the neural networks rather than a set of features from the edge direction histogram, is that the neural network provides a tool to learn and interpret complex data. Thus, it can avoid the bias introduced by the selected features and make classification more accurate and robust.

The results of the first level neural network are then input to the second level neural network which aims to reduce the ambiguity existed in decision networks and provide final classification result. Its output should indicate which shape pattern the input histogram belongs to. Similar to the decision neural network, the classification neural network consists of three layers. The input layer of the classification neural network contains six nodes, two for each decision neural network. The output layer has three nodes specifying three shape pattern of the histogram: the one-peak shape pattern, the two-peak shape pattern and the other shape pattern.

According to the present invention, another shape pattern, the no edge pattern, is added to the shape classification result by using a rule-based method which examines the existence of edge in an image. This shape pattern is used to represent an image without background, therefore no edge can be found in the image. This could occur when the collimation blades are set to expose only anatomical structures, and no direct exposure region existed in the image.

A final stage is to combine the results from the physical size and shape pattern classification, and categorize the radiograph. According to a preferred embodiment, eight classes are identified:

1. The large-size anatomy with no edge, such as the PA view of abdomen, thorax spine and lumbar spine.
2. The large-size anatomy with a one-peak shape edge direction histogram, such as the PA view of hip and shoulder.
3. The large-size anatomy with a two-peak shape edge direction histogram, such as the lateral (LAT) view of chest and the PA view of pelvis.
4. The large-size anatomy with the other shape edge direction histogram, such as the PA and LAT view of skull.
5. The small-size anatomy with no edge, such some PA and LAT view of knee because of the setting of collimator.
6. The small-size anatomy with a one-peak shape edge direction histogram, such as some PA and LAT view of femur, elbow, forearm and ankle, in which the collimation region covers parts anatomy and results in only one edge detected in the image.
7. The small-size anatomy with a two-peak shape edge direction histogram, such as most PA and LAT view of elbow, forearm, ankle and wrist.
8. The small-size anatomy with the other shape edge direction histogram, such as the PA and LAT view of foot, hand and fingers.

Due to the examination conditions, the size and position, as well as orientation of anatomy from the same examination could be varying. In addition, the portion of anatomy shown in the radiograph is also varied depending on the patient's situation and the setting of collimation blades. These factors can result in the different looks of radiographs, which makes the classification very challenging. The present invention provides for the ambiguity in classification, therefore a radiograph can be categorized as one or more of the above classes. This ambiguity is expected to be reduced in the further classification.

The present invention may be implemented for example in a computer program product. A computer program product may include one or more storage media, for example: magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The system of the invention can include a programmable computer having a microprocessor, computer memory, and a computer program stored in said computer memory for performing the steps of the method. The computer has a memory interface operatively connected to the microprocessor. This can be a port, such as a USB port, over a drive that accepts removable memory, or some other device that allows access to camera memory. The system includes a digital camera that has memory that is compatible with the memory interface. A photographic film camera and scanner can be used in place of the digital camera, if desired. A graphical user interface (GUI) and user input unit, such as a mouse and keyboard can be provided as part of the computer.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Processing step for inputting a radiograph.
11 Processing step for segmenting the image into foreground, background and anatomy regions
12 Processing step for classifying the physical size of anatomy.
13 Processing step for classifying shape pattern of edge direction histogram of image
14 Processing step for categorizing said image by combining the physical size and shape of anatomy
20 Processing step for extracting the edge of anatomy
21 Processing step for computing the edge direction histogram
22 Processing step for classifying shape pattern of edge direction histogram using neural network based shape classifier

What is claimed is:

1. A method for automatically classifying a digital radiographic image, comprising the following steps, carried out by a programmable digital computer, of:

acquiring the digital radiographic image comprised of a matrix of rows and columns of pixels;
segmenting the image into foreground, background, and anatomy regions;
classifying a physical size of the anatomy region using image capture information;
classifying a shape pattern of the anatomy region; and
categorizing the image based on the physical size classification and the shape pattern classification;
wherein the step of classifying a physical size comprises:
collecting image capture parameters
computing features from the foreground, background and anatomy regions;
training a classifier with the features and image capture parameters; and
performing the classification using the trained classifier; and
wherein said features and said image capture parameters include one or more of the following: a ratio of the anatomy's area to the image area, a ratio of the background area to the image area, and a ratio of the foreground area to the image area.

2. A method for automatically classifying a digital radiographic image, comprising the following steps, carried out by a programmable digital computer, of:

acquiring the digital radiographic image comprised of a matrix of rows and columns of pixels;
segmenting the image into foreground, background, and anatomy regions;
classifying a physical size of the anatomy region using image capture information;
classifying a shape pattern of the anatomy region; and categorizing the image based on the physical size classification and the shape pattern classification:

wherein the step of classifying the shape pattern comprises the steps of;

extracting edges of the anatomy regions;

generating an edge direction histogram of the anatomy region; and classifying the edge direction histogram using a scale and rotation invariant shape classifier; and wherein the step of categorizing the image categorizes the images according to at least one of the following classes:
- a large-size anatomy with no edge, such as the PA (Posterior-Anterior) view of abdomen, thorax spine and lumbar spine;
- a large-size anatomy with a one-peak shape edge direction histogram, such as the PA view of hip and shoulder;
- a large-size anatomy with a two-peak shape edge direction histogram, such as the lateral (LAT) view of chest and the PA view of pelvis;
- a large-size anatomy with an other share edge direction histogram, such as the PA and LAT view of skull;
- a small-size anatomy with no edge, such some PA and LAT view of knee because of the setting of collimator;
- a small-size anatomy with a one-peak shape edge direction histogram, such as some PA and LAT view of femur, elbow, forearm and ankle, in which the collimation region covers parts anatomy and results in only one edge detected in the image;
- a small-size anatomy with a two-peak shape edge direction histogram, such as most PA and LAT view of elbow, forearm, ankle and wrist;
- a small-size anatomy with an other share edge direction histogram, such as the PA and LAT view of foot, hand and fingers.

3. The method of claim 2, wherein the step of classifying the edge direction histogram normalizes the edge direction histogram to achieve scale invariance.

4. The method of claim 2, wherein the step of classifying the edge direction histogram comprises the steps of:

training two or more classifiers to identify different shape patterns of the edge direction histogram to achieve rotation invariance;

performing the classification of the edge histogram of the input image using the trained classifiers; and categorizing the shape pattern of the image by combining the classification results from different classifiers.

5. The method of claim 1 wherein said features and said image capture parameters include one or more of the following: pixel spacing, width and height of the anatomy region.

* * * * *